Figure 1:
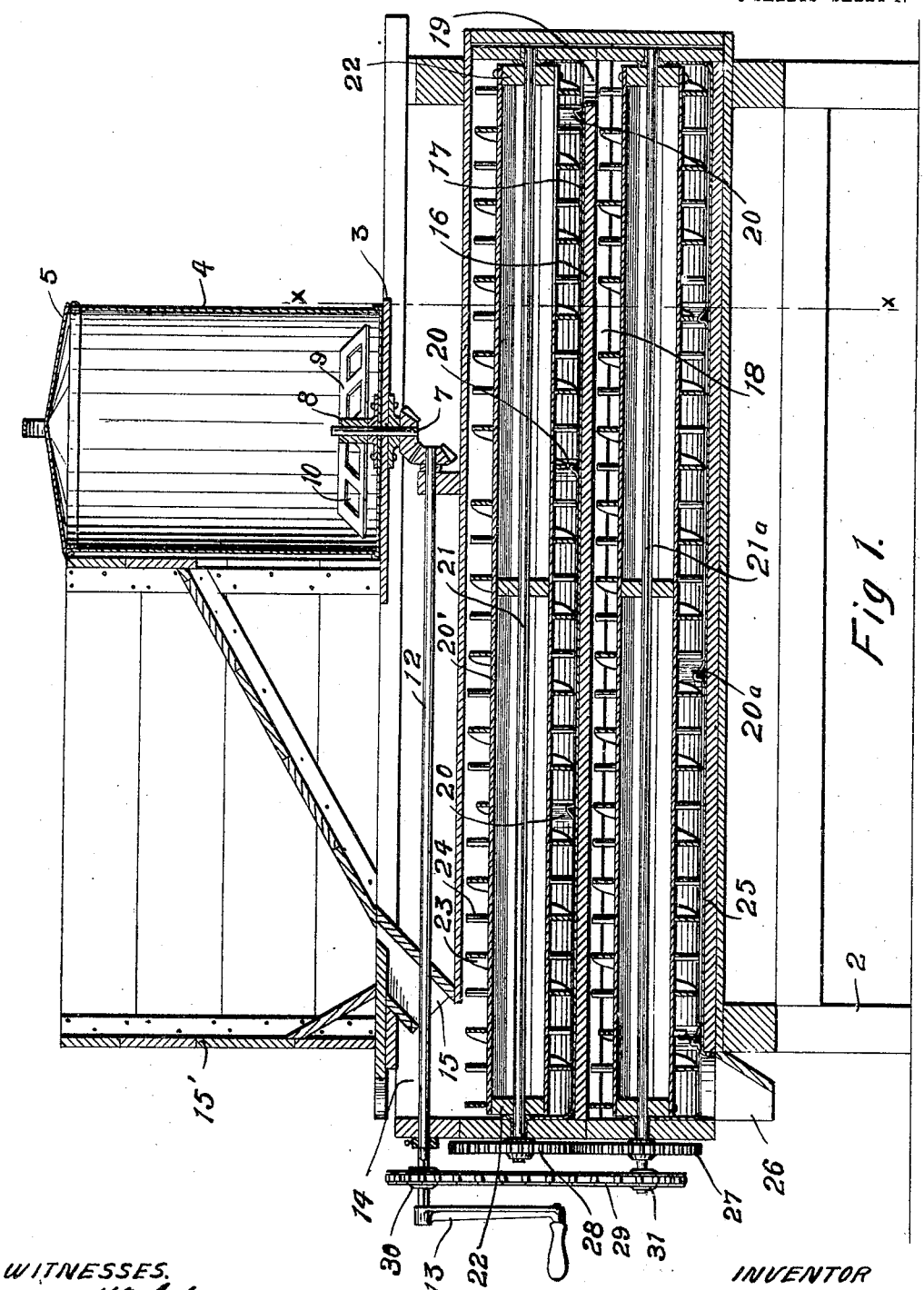

No. 799,824. PATENTED SEPT. 19, 1905.
A. H. BAENEN.
SMUT MACHINE.
APPLICATION FILED DEC. 1, 1904.

3 SHEETS—SHEET 1.

WITNESSES.
INVENTOR
ANTHONY H. BAENEN.
BY
HIS ATTORNEYS.

No. 799,824. PATENTED SEPT. 19, 1905.
A. H. BAENEN.
SMUT MACHINE.
APPLICATION FILED DEC. 1, 1904.
3 SHEETS—SHEET 2.
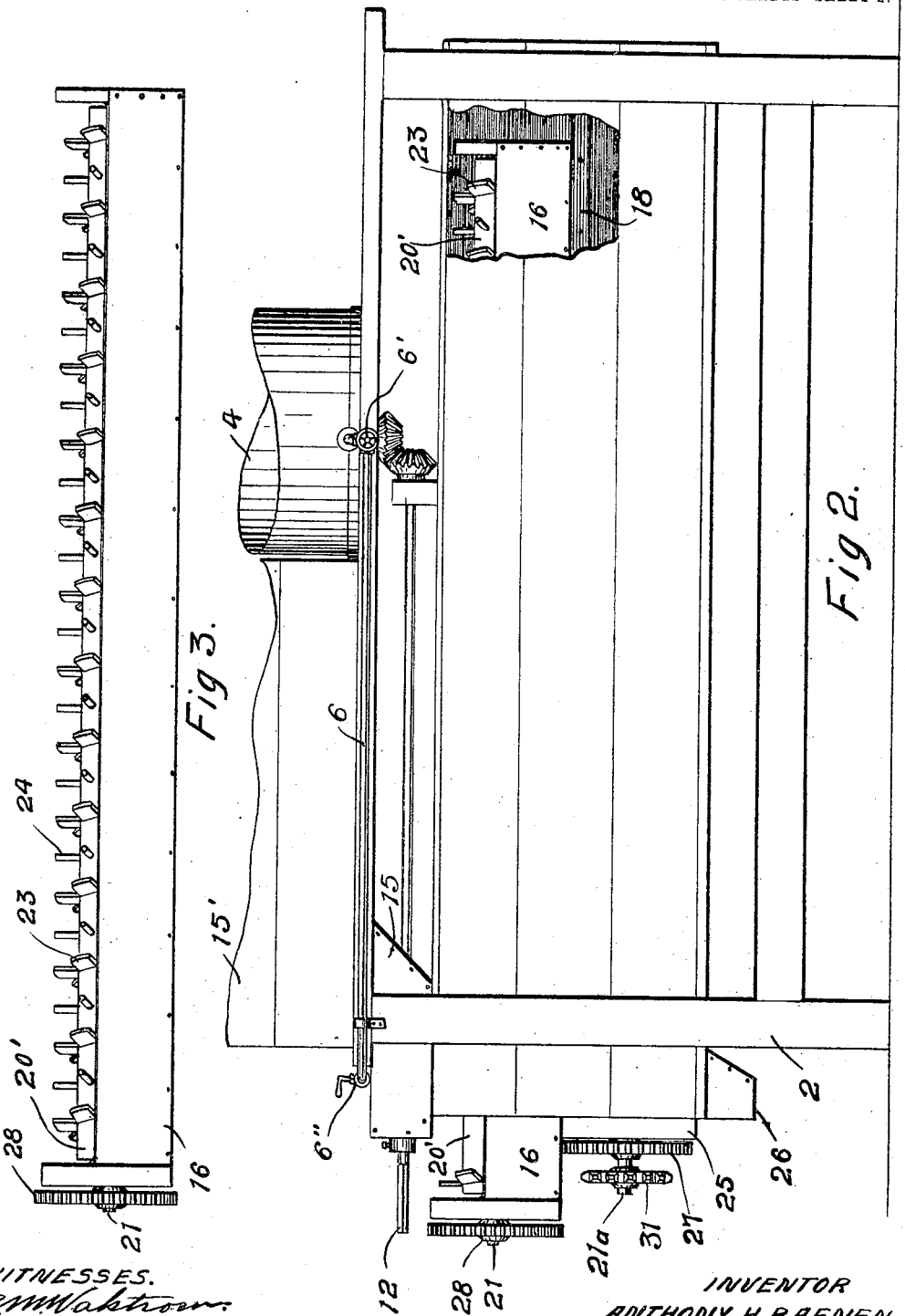
WITNESSES.
INVENTOR
ANTHONY H. BAENEN.
BY Paul & Paul
HIS ATTORNEYS.

No. 799,824. PATENTED SEPT. 19, 1905.
A. H. BAENEN.
SMUT MACHINE.
APPLICATION FILED DEC. 1, 1904.
3 SHEETS—SHEET 3.
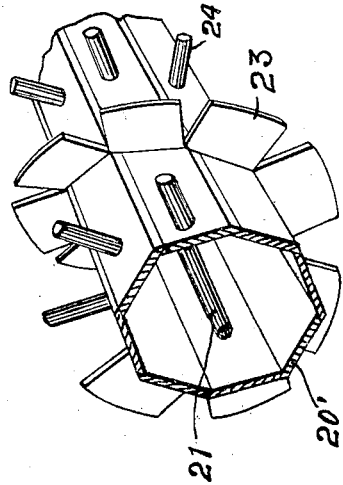
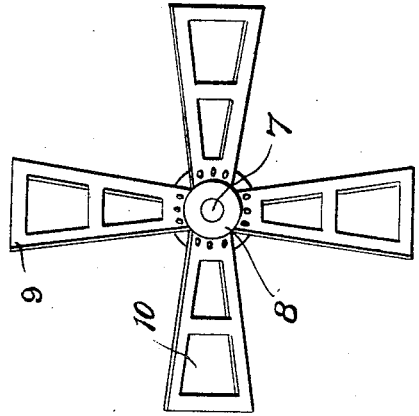
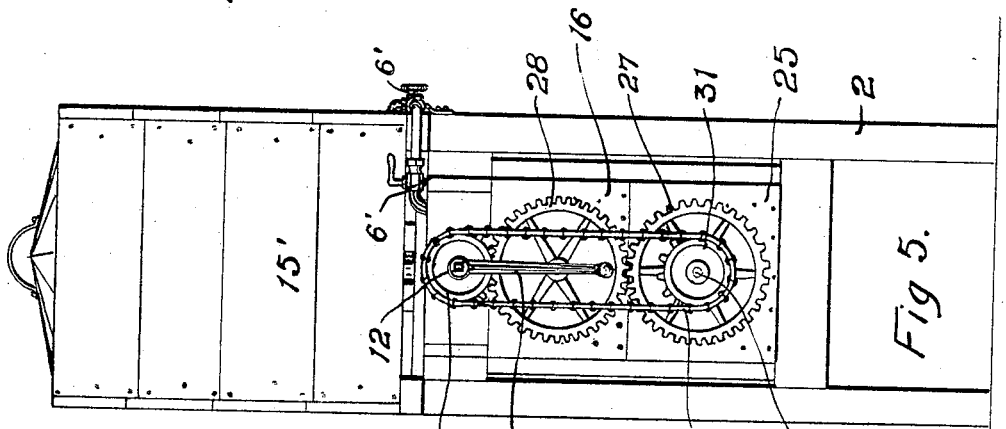
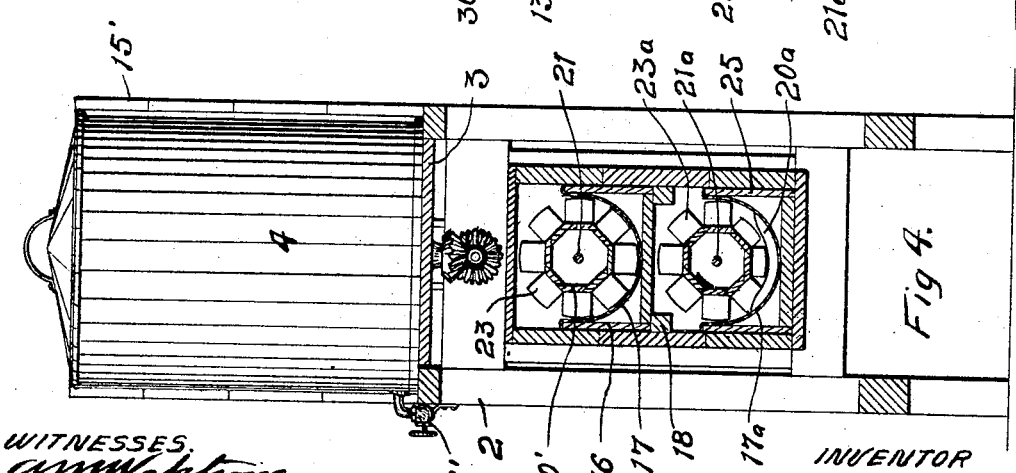
WITNESSES.
INVENTOR
ANTHONY H. BAENEN.
BY Paul & Paul
HIS ATTORNEYS.

UNITED STATES PATENT OFFICE.

ANTHONY H. BAENEN, OF JAMESTOWN, NORTH DAKOTA.

SMUT-MACHINE.

No. 799,824. Specification of Letters Patent. Patented Sept. 19, 1905.

Application filed December 1, 1904. Serial No. 234,991.

*To all whom it may concern:*

Be it known that I, ANTHONY H. BAENEN, of Jamestown, Stutsman county, North Dakota, have invented certain new and useful Improvements in Smut-Machines, of which the following is a specification.

My invention relates to machines for treating seed-wheat and other grains; and the object of the invention is to provide a machine in which every kernel will be thoroughly and evenly treated without becoming saturated with the mixture so as to render the seed unfit for immediate seeding or to cause danger of sprouting.

A further object is to provide a smut-machine having a large capacity and one that can be easily and economically operated.

Other objects of the invention will appear from the following detailed description.

The invention consists generally in various constructions and combinations, all as hereinafter described, and particularly pointed out in the claims.

In the accompanying drawings, forming part of this specification, Figure 1 is a vertical longitudinal section of a smut-machine embodying my invention. Fig. 2 is a side elevation. Fig. 3 is a side view of one of the mixing-troughs removed from the machine. Fig. 4 is a vertical section on the line $x\ x$ of Fig. 1. Fig. 5 is an end view. Fig. 6 is a perspective view of a portion of one of the mixing-cylinders. Fig. 7 is a detail of the mixing device provided in the solution-tank.

In the drawings, 2 represents a frame provided with a platform 3, upon which an iron or wooden solution-tank 4, having a tight-fitting cover 5 and a draw-off pipe 6 and faucets 6' and 6'', is mounted. This tank is adapted to contain a solution of blue vitriol or formaldehyde of sufficient strength to kill the smut and other deleterious germs without in any way injuring the grain.

To keep the mixture stirred up, I provide an upright shaft 7 in the bottom of the tank, whereon a mixer 8, having a series of fans 9, provided with holes 10, is mounted. There are preferably four blades or fans on the mixer, two of which are pitched or inclined in one direction and the other two in the other direction, and the blades being perforated the solution will be kept thoroughly stirred up and in suitable condition for discharge into the mixing-troughs. The mixer 8 is revolved by means of a beveled pinion on the lower end of the shaft 7 meshing with a similar pinion on a shaft 12, provided with an operating-crank 13.

The machine-casing is provided beneath the faucet 6' with a feed-opening 14, with which a grain-spout 15, leading from the hopper 15', communicates. Below the feed-opening is a mixing-trough 16, having closed ends and sides and an open top and lined, preferably, with galvanized iron 17, that is semicircular in cross-section, with its edges secured to the sides of the trough. Bars 18 are provided beneath the trough on the side walls of the machine to support the trough and allow it to be withdrawn from the machine or inserted therein. The bottom of the trough is provided with a discharge-opening 19 at the opposite end from the feed-opening 14, and ribs 20 are secured to the lining of the trough at intervals extending across the bottom and part way up the sides, as shown in Fig. 4. There may be as many of these ribs as desired; but I prefer to provide one at the edge of the opening 19 to prevent dripping of the solution from the trough and one near the receiving end and one at the middle, though of course a greater number may be employed, if preferred. Within the trough I provide a mixing-cylinder 20', mounted on a shaft 21, that has bearings in the end of the trough and is removable therewith from the machine or may be taken out separately, if preferred. The cylinder 20 has heads 22 at the ends and in the middle, through which the shaft 21 passes, and on its surface the said cylinder is provided with a series of spirally-arranged flights or paddles 23, extending from one end of the cylinder to the other, and between the convolutions of the spiral are a series of mixing pegs or pins 24, which coöperate with the paddles to thoroughly mix the grain with the solution as it is advanced by the paddles from one end of the machine to the other. Beneath the trough 16 is a second trough 25, corresponding to the one described, except that it has a discharge-opening 26 beneath the receiving end of the trough 16. The trough 25 is lined in the same manner as the one first described and is provided with a cylinder of substantially the same construction, and I will therefore designate the said lining and cylinder by the same reference-numeral as employed with reference to the first cylinder with the addition of the letter "a." The ribs 20ª are the same as those described, and one of them is arranged at the end of the discharge-opening 26 to prevent the machine leaking or dripping unnecessarily at that point. The shaft 21ª is provided with a gear 27, meshing with a similar gear 28 on the shaft 21, and a chain 29 connects a sprocket 30 on the shaft 12 with a similar sprocket 31 on the shaft 21ª. Upon operating the shaft 12 the solution tank-mixer will be set in motion, and the mixing-cylinders will be revolved in opposite directions to advance the grain from one end of the machine to the other and back again, during which time it will be thoroughly mixed with the solution, all the kernels will be evenly treated, and at the same time only a sufficient amount of the solution will be used to destroy the smut and other deleterious germs without unnecessary wetting of the grain, so that it will require time for drying after leaving the machine.

The operation of the machine is as follows: The mixing devices having been set in motion, the operator will allow wheat or other grain to flow into the machine through the spout 15 and mingle with a sufficient amount of solution to produce the desired result. As the upper mixing-cylinder revolves the grain will be thoroughly stirred by the action of the paddles and pins and all the kernels exposed to the action of the solution. At the same time the grain will be fed forward toward the discharge-opening 19, the ribs preventing its too rapid travel. Upon reaching the opening 19 the grain and solution will drop through into the trough beneath and be carried along by the reversely-operating cylinder back to the receiving end of the machine, where the grain will be discharged through the opening 26. The cylinders can be operated at any desired speed that is found to produce the best results, and the feed of the solution into the receiving-trough will be measured according to the volume of grain and its condition. If the machine has been used for treating wheat and it is desired to use it for another grain, the troughs can be readily removed and cleaned, and at any time upon detaching the shafts from their bearings the cylinders may be taken entirely out of the troughs.

I claim as my invention—

1. In a smut-machine, the combination, with a casing having a feed-spout, of a solution-tank having a discharge-faucet, a mixing-paddle provided in the bottom of said tank, an operating-shaft geared to said paddle, mixing-troughs arranged one above another in said casing, the upper trough having a receiving-opening communicating with said feed-spout and a discharge-opening in its opposite end leading to the lower trough, and said lower trough having a discharge-opening in its end opposite from said first-named discharge-opening, mixing-cylinders provided in said troughs having a series of spirally-arranged paddles or mixers on their surfaces, and a suitable gear connecting said mixing-cylinders with said shaft, substantially as described.

2. In a smut-machine, the combination, with a suitable frame and a hopper provided thereon having a feed-spout, of a solution-tank provided with a discharge-faucet, a mixing-paddle provided in the bottom of said tank, an operating-shaft geared to said paddle, mixing-troughs arranged one above another in said casing, the upper trough having a receiving-opening at one end beneath the discharge end of said feed-spout, and a discharge-opening in its opposite end leading to a lower trough next beneath, and said lower trough having a discharge-opening in its end opposite from said first-named discharge-opening, mixing-cylinders provided in said troughs having peripheral paddles or mixers, webs provided at intervals in the bottom of said troughs and adapted to retard the passage of the grain along said troughs, and a driving mechanism connecting said cylinders with said shaft, substantially as described.

3. In a smut-machine, the combination, with a suitable casing, of mixing-troughs arranged one above another the upper trough having a receiving-opening at one end communicating with a feed-spout and a solution-tank and having a discharge-opening in the bottom at the other end, and the lower trough receiving the grain at one end from said discharge-opening and having a discharge-opening in its bottom beneath the receiving end of the upper trough, oppositely-revolving mixing-cylinders provided in said troughs and having peripheral blades or mixing-paddles, and ribs provided at intervals in the bottom of said troughs and adapted to retard the passage of the grain therethrough and there being ribs contiguous to said discharge-openings to prevent dripping and waste of the solution, and means for revolving said cylinders, substantially as described.

In witness whereof I have hereunto set my hand this 1st day of November, 1904.

ANTHONY H. BAENEN.

Witnesses:
D. BALDWIN, Jr.,
BERNARD BAENEN.